United States Patent

[11] 3,590,161

[72] Inventor Albert A. Jacobs
434 W. River Front Drive, Milwaukee, Wis. 53217

[21] Appl. No. 824,475

[22] Filed May 14, 1969

[45] Patented June 29, 1971

[54] TELEPHONE LINE MONITORING SYSTEM
6 Claims, 2 Drawing Figs.

[52] U.S. Cl. 179/7.1, 179/7, 179/11

[51] Int. Cl. H04m 15/18

[50] Field of Search 179/7.1, 7.1 TP, 7, 11

[56] References Cited

UNITED STATES PATENTS

| | | | |
|---|---|---|---|
| 1,025,378 | 5/1912 | Crichton | 179/11 |
| 1,074,677 | 10/1913 | Williams | 179/11 |
| 2,073,756 | 3/1937 | Osten-Sacker | 179/7.1 |
| 2,094,060 | 9/1937 | Busch | 179/7.1 |
| 2,383,826 | 8/1945 | Spencer | 179/7.1 |
| 2,533,677 | 12/1950 | McCreary | 179/7.1 |
| 3,320,366 | 5/1967 | Plummer | 179/7.1 |

*Primary Examiner*—Kathleen H. Claffy
*Assistant Examiner*—Jan S. Black
*Attorney*—Wheeler, Wheeler, House & Clemency

ABSTRACT: Initiation of a telephone call on a monitored line closes a relay which registers, and optionally makes a record of, total time of line use. A secondary relay is also closed. After a regulated period of time, this feeds periodic audible signals into the telephone line and visually signals the local operator to indicate that the usage exceeds the predetermined norm. After these signals have been given for a predetermined period, the operator is again notified and the call may either be automatically or manually terminated. In any event, a record is made for the benefit of management to show the extension through which the overtime call was handled.

INVENTOR
ALBERT A. JACOBS

Wheeler, Wheeler, House & Clemency
ATTORNEYS

TELEPHONE LINE MONITORING SYSTEM

BACKGROUND OF INVENTION

It is in the interest of the telephone company and its subscribers to prevent lines from being monopolized unnecessarily. This is particularly true of long-distance calls either on a metered basis or on a so-called Wats line or other special unmetered services. In the past, there have been no satisfactory or simple means of monitoring or otherwise controlling telephone line use.

SUMMARY OF INVENTION

A major feature of the instant invention is to provide monitoring and control which is primarily automatic except insofar as canceled by the operator. Even when the operator cancels the warning or permits the call to continue, the overtime is metered, thus making it possible for management to regulate the excessive usage by disciplining the persons responsible.

A call of "normal" duration proceeds normally without interference. At the expiration of the predetermined period of a normal call, an audible signal is evident to the persons using the line. At the same time, a visual signal is given the operator. This situation continues for a predetermined grace period which can be adjusted by management. At the expiration of this extended period, the operator receives a further visual indication which enables her to terminate the call arbitrarily. Alternatively, the operator may, if so instructed, shut off the warning signals at any time.

Use of the invention greatly increases the service received from the lines controlled and, in the case of metered calls, the cost is very substantially reduced. Employee efficiency is notably increased as an incidental advantage, since persons using the telephone line learn to organize their thoughts in advance of placing the call and to state their positions accurately and concisely to avoid being held responsible for overtime calls.

DETAILED DESCRIPTION

Figures 1, 2:
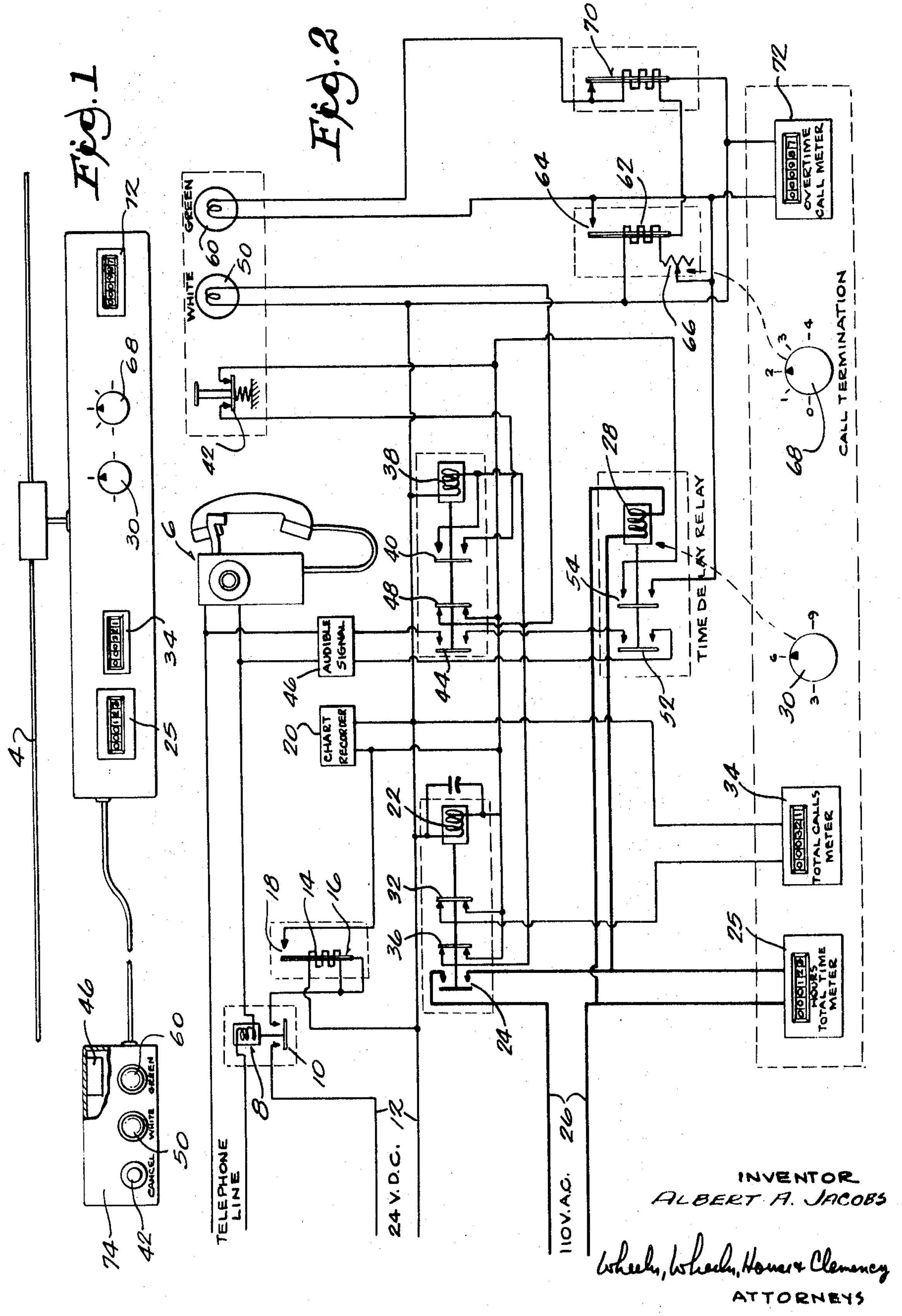
FIG. 1 is a front elevational view of apparatus embodying the invention.
FIG. 2 is a circuit diagram of the apparatus.

The telephone line 4 connects with an instrument 6 and includes a relay 8 provided by the telephone company. When the line is in use, the NO switch 10 of relay 8 closes to connect the low voltage circuit 12 to the heating element 14 of relay 16. This will result in closing NO switch contacts 18 within about 15 seconds after the first dialing of the number called.

The closing of switch contacts 18 supplies current to a chart recorder 20 which makes a record of the call. Low voltage current is also supplied through switch contacts 18 to the relay 22. In practice, contacts 24, 36 and 32 of relay 22 operate approximately 75 miliseconds after voltage is applied to the coil of relay 22.

The response of relay 22 closes NO switch contacts 24 in a high voltage circuit 26 (110 volt AC). This circuit connects to the total time recording meter 25 to put this meter into operation. Meantime, and prior to the delayed response of relay 22, low voltage current has been supplied through the normally closed contacts 36 of this relay to relay 38 through the NC cancel button switch 42. During the 75 miliseconds delay, the relay 38 responds to complete a holding circuit through the NO switch contacts 40, current being dependent on the continuance of cancel button contacts 42 in their normally closed condition.

The energization of relay 22 will open the NC switch contacts 36 but, due to the holding circuit completed through contacts 32 of the cancel button switch 42 the relay 38 will remain energized. Relay 22 continues to be energized as long as conversation on the line continues, thus assuring that the total time meter 25 records the total use of the monitored line. Meantime, however, the NC contacts 32, which open after a 75 milisecond delay, will open the circuit to the total call meter 34 and the chart recorder 20.

The use of line 4 continues in normal manner until a predetermined "free" period has elapsed. This period is determined by a time delay relay 28, the response of which is fixed by a manually operable control 30. As shown, this may be used to adjust the delayed response of relay 28 for any period up to 9 minutes.

An audible signal generating device 46 is connected to the telephone line 4 to deliver into the line a "beep" audible to the users thereof. This signal is not delivered into the line until the NO contacts 44 of relay 38 and the NO contacts 52 of relay 28 are both closed. The contacts 44 will have been closed immediately upon energization of relay 38, shortly following the commencement of the use of the line. The contacts 52 will not be closed until the lapse of a predetermined period fixed by the control member 30. For example, management in a plant having monitored installation of the type disclosed might wish to allow 3 minutes of clear conversation before the audible signal 46 is fed into the line. At the expiration of the 3 minute period, the contacts 52 of relay 28 will close. Concurrently, the contacts 54 of relay 28 will close. When this happens, low voltage current will be supplied through the potentiometer 66 to the heater 62 controlling NO relay contacts 64. The setting of the potentiometer by means of controller 68 will determine the time which will elapse before the contacts 64 will close. Energization of the green signal light 60 at the operator's station will indicate to the operator that the audible signal is being fed into the telephone line 4.

After the lapse of time representing the grace period for which the controller 68 is set, current supplied through the NO switch contact 64 to the flasher 70 will cause the green light 60 to flash. This will indicate to the operator that the user of the line has not only used the initial free period but also the grace period allowed according to the setting of control 68, and is now in a period of unauthorized usage. The line may arbitrarily be opened electronically, or the operator may allow the call to continue, or the operator may open the line. Whether the call is terminated voluntarily or whether the operator opens the line, in either case, the holding circuit to relay 38 is broken and all relays are restored to initial positions.

It will be understood that the cancel switch button 42 and the lights 50 and 60 are mounted in a small cabinet 74 immediately accessible to the telephone operator. At her option, she may cancel the audible signal at any time by pushing the cancel button switch 42.

Except as indicated, the rest of the apparatus is in cabinet 76. In the front of this cabinet, the total time meter 25, the total call meter 34 and the overtime call meter 72 are exposed, as are the controllers 30 and 68.

SUMMARY OF OPERATION

The time controls 30 and 68 are set to the desired values. Thereupon the entire system functions automatically when a telephone call takes place.

Until a call occurs, the white lamp 50 is illuminated. When a call occurs, the white light is extinguished. After the call has lasted for the duration fixed by the control 30, the green lamp 60 is illuminated. This indicates to the operator that the audible signal is being fed by generator 46 to the line. In practice this signal is momentary and repeated every 15 seconds.

After this signal is fed in the line, and if the call continues for the grace period fixed by controller 68, the green lamp 60 begins to flash and record of the overtime is made on the overtime meter 72. This meter responds to all overtime calls and the operator is, of course, able to identify by conventional means the extension from which the overtime call is being conducted. This gives management complete record and control.

Meantime, it is advantageous that all the hours of use of the line 4 are recorded in the meter 25.

The operator also maintains control sufficient so that in cases where management deems it essential that the call continue, the audible signal 46 can be canceled by momentary depression of the button of cancel switch 42.

The use of the recorder 20 is an optional feature which can be used, if desired, to make a chart showing completely as to each call the time of commencement and time of termination.

I claim:

1. An extension telephone line monitoring system which includes a substation relay in the monitored line actuated by use of said relay operated by said substation relay for signalling to a user of the line the expiration of a time-controlled relay an initial period of line usage, means for recording the period of extended use of the line beyond the expiration of said initial period and means for recording the total period of line use and also recording the total of periods of extended use of the line beyond the said initial period of use thereof.

2. A telephone line monitoring system in which an extension line controlled by an operator includes a relay at the substation station and operated by use of said extension, and means at the subscriber's station successively actuated from said relay for feeding an audible signal into said line during a grace period after a predetermined period of free use thereof; means for subsequently indicating the expiration of the grace period during which said audible signal has been fed into said line; and means for separately recording the total of periods of use of said line and the respective periods for which the line is used following the expiration of respective periods of free use thereof.

3. A monitoring system according to claim 2 including means for signalling to the operator controlling the line, first, that the line has been placed in use, second, that a period of free use has expired, and third, the fact that a predetermined grace period has expired.

4. A line monitoring system according to claim 2 in which the operator in charge of said line is provided with means for cancelling signals as to grace period of use, and signals as to continued use following expiration of the grace period.

5. A telephone line-monitoring system according to claim 3 in which there is an audible signal generator and said means includes a time delay relay having a controller for adjusting the period of time delay and having contacts which, upon closing, effect delivery of an audible signal from said generator into the line.

6. A telephone line-monitoring system according to claim 5 in which said means further includes a second time delay relay having control means for adjusting the time required for its response, a signalling device including a circuit for which said second time delay relay has circuit closing contacts, and a third time delay relay including flashing means for said signalling device for indicating the expiration of a given period for which the signalling device has been operative.

UNITED STATES PATENT OFFICE
CERTIFICATE OF CORRECTION

Patent No. 3,590,161 Dated June 29, 1971

Inventor(s) Albert A. Jacobs

It is certified that error appears in the above-identified patent and that said Letters Patent are hereby corrected as shown below:

Column 3, Line 13, after "relay", first occurrence, insert -- and a time controlled relay --;

Column 3, Line 14, delete "a time controlled relay"

Column 3, Lines 21-22, change "substation" to - subscriber -

Signed and sealed this 1st day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334